Sept. 13, 1960 R. R. GOINS ET AL 2,952,038
PROCESS FOR PREVENTING THE FORMATION OF VOIDS AND POCK
MARKS IN THE EXTRUSION OF OLEFIN POLYMERS
Filed Jan. 17, 1957
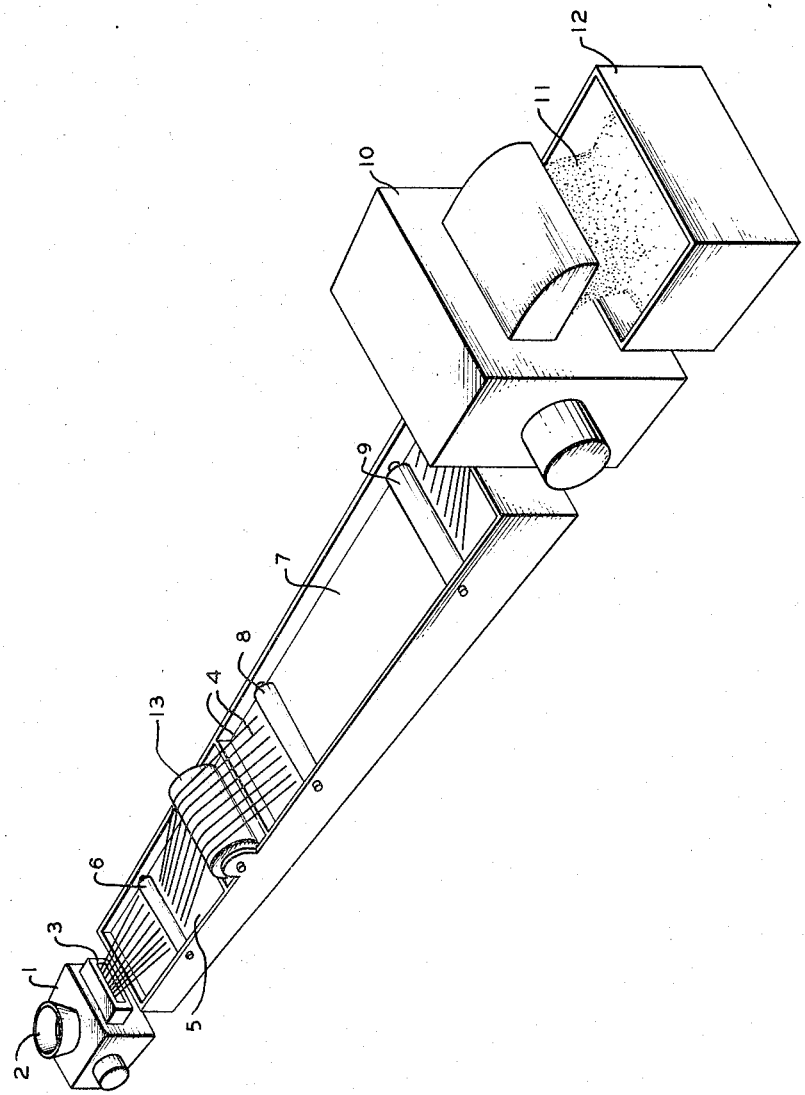
INVENTORS
R. R. GOINS
E. J. KOSINSKY
BY
ATTORNEYS

2,952,038
PROCESS FOR PREVENTING THE FORMATION OF VOIDS AND POCK MARKS IN THE EXTRUSION OF OLEFIN POLYMERS

Robert R. Goins and Edward J. Kosinsky, Bartlesville, Okla., assignors to Phillips Petroleum Company, a corporation of Delaware Filed Jan. 17, 1957, Ser. No. 634,722

8 Claims. (Cl. 18—47.5)

This invention relates to 1-olefin polymer extrusion. In one of its aspects, this invention relates to extruding and pelleting of high melting point polymers of 1-olefins.

In the preparation of 1-olefin polymers for shipment to users thereof, the polymer is often extruded as strands and chopped into pellets. The polymer, after preparation, is first melted and is extruded as a strand through a die after which it is solidified by drawing through a liquid bath, such as water. Recently 1-olefin polymers of high melting temperature have been discovered and the extrusion and pelleting of such polymers has increased the normal extrusion and pelleting problems. When high melting point polyethylene strands come into contact with hot water, the hot strands cause the water to boil which produces pock marks on the strand surface which are quite objectionable as to sales appeal. If the water bath is cool enough to prevent boiling and pock marks, the polyolefin strand is first "set" or hardened on its outer surface, and then as the inner material cools, shrinkage of the material causes voids within the strands, which are objectionable when the material is further processed such as into finished shapes by extrusion or molding. With the older low melting point polyolefins such as polyethylene, the problem has not been too serious and with careful control of bath temperature, the problem has been minimized. However, with the advent of the high melting point polyolefins, the problem has been intensified and control of bath temperature even within narrow limits has not eliminated the problem. Therefore, while this invention is applicable to the finishing of polyolefins broadly, it has particular advantage with the more recent catalytically prepared high melting point polyolefins.

It is an object of this invention to provide an improved finishing method for polyolefins.

It is another object of this invention to provide a method of extruding and pelleting polyolefins without forming pock marks or voids.

Still other objects, advantages and features of this invention will be obvious to those skilled in the art having been given this disclosure.

According to this invention, a polyolefin above the softening temperature is extruded as a strand, the strand cooled in contact with a liquid at a low temperature which cools the surface and the strand subsequently contacted with a liquid at higher temperature than the first contacting liquid but below the softening temperature to harden the remaining polyolefin.

As has been indicated, this invention is applicable to solid polyolefins broadly. In preparing polymers from 1-olefins other than ethylene, the product often is a mixture of solid and non-solid polymers, however, the solid polymers can be recovered by known methods and can be finished by the method of this invention. The amount of solid polymer so produced will be dependent upon many factors such as the particular catalytic system being employed, polymerization conditions and the particular 1-olefins being polymerized. When polymerizing ethylene, solid polymers are readily formed and have found many uses in commerce. The ethylene can be polymerized alone or with other 1-olefins. It is known to those skilled in the art that generally larger percentages of the lower molecular weight 1-olefins can be tolerated than of the higher molecular weight 1-olefins. In general the 1-olefins copolymerized with ethylene are employed in an amount of not more than about 10 weight percent, however, larger amounts of the lower molecular weight materials can be tolerated and solid polymers obtained. Even with larger amounts of other 1-olefins, some solid polymer is formed which can be recovered and processed by the present invention. However, for those reasons, it is preferred to use 1-olefins comprising at least 50 percent ethylene and preferably 90 percent. Also, as has been indicated, the present invention is particularly applicable to those high melting point polymers which have recently come into prominence.

It has been recently discovered that 1-olefins having a maximum of 8 carbon atoms per molecule and no branching nearer the double bond than the 4-position can be polymerized to solid and semi-solid polymers at low temperatures and pressures as compared with conventional processes for polymerizing these olefins. Such polymerization is generally carried out by first admixing and at least partially dissolving the olefins in a non-polymerizable solvent and carrying out the polymerization in the presence of a catalyst. Polymers prepared by such processes have a softening point substantially higher than polymers prepared by the older high temperature methods, e.g., polyethylene having a softening temperature when prepared with a chromium oxide catalyst in excess of about 260° F.

In the copending application of Hogan et al., filed March 26, 1956, and having Serial No. 573,877, now Patent No. 2,825,721, a process is disclosed for producing novel polymers of 1-olefins preferably having 2 to 8 carbon atoms per molecule and no branching nearer the double bond than the 4-position by carrying out the polymerization at a temperature in the range of 100 to 500° F. in the presence of 0.1 to 10 or more weight percent of chromium as chromium oxide, including a substantial proportion of hexavalent chromium associated with at least one porous oxide selected from the group consisting of silica, alumina, zirconia, and thoria. A preferred catalyst is one comprising 0.1 to 10 weight percent chromium as the oxide on a silica-alumina support such as 90 percent silica-10 percent alumina. This catalyst is ordinarily a highly oxidized catalyst which has been activated by high-temperature treatment, e.g. 450–1500° F., preferably 900–1000° F., under non-reducing conditions and preferably with an oxidizing gas such as air. The catalyst size can vary over a wide range, say up to 40 mesh, however, catalyst of microspherical proportions is generally preferred. Olefins, other than 1-olefins as described, are polymerized by the action of this catalyst but many of the resulting polymers are preponderantly normally liquid at least when polymerized under the described conditions. The polymerization is suitably carried out in the liquid phase such as in solution in a hydrocarbon solvent, especially a paraffin or cycloparaffin which is liquid under the polymerization conditions; however, vapor phase operation or mixed phase operation can be effected. Also, diolefins can be polymerized by the chromium oxide catalyst to produce solid polymers. Solid polymers of 1-olefins can also be prepared by other catalyst systems and finished by the process of this invention, e.g., polymers prepared by organo-metallic catalyst such as those disclosed by Karl Ziegler in Belgian Patent 533,362, November 16, 1954.

As has been said, this invention comprises contacting freshly extruded strands of polymer having a temperature above the softening point of the polymer with a relatively cold liquid just long enough to harden the surface thereby removing some of the heat content of the strand and thereafter contacting the strand with relatively warm liquid to provide for slow hardening of the remaining polymer. The contact time in each of these zones can vary over a wide range, depending upon the softening temperature of the polymer, the temperature of the polymer as extruded, the temperature of the bath, etc. In general, when treating polyethylene, we prefer an initial bath temperature of only slightly below that which causes boiling, however, temperature within the range of just above the freezing point of the liquid up to, say 150° F. are operable and we prefer to use a temperature within the range 40 to 140° F., and more preferably within the range of 120 to 140° F. The strand will then pass to a liquid bath of higher temperature preferably through an air bath over a cooler roller wherein the heat within the strand is redistributed again, softening the outside of the strand. The temperature of this second bath should be sufficiently high to allow the strand to cool at a lower rate and substantially uniformly therethrough. In general, the temperature of this second bath will be in the range of 150° F. to the boiling point of the liquid, but in any case at least 20° F. higher than the initial bath temperature and below the solidification temperature of the polymer. We prefer a temperature, when treating polyethylene, within the range of 160–200° F. Still a third bath can be used, if desired, to lower the temperature of the strand even further. In this third bath, a temperature within the range as specified for the initial bath will be satisfactory, and preferably a temperature within the range of 120–140° F. will be employed.

This invention can best be described by referring to the accompanying drawing which is a schematic representation of a die, bath and cutter arrangement of this invention.

Since the polymer of greatest commercial interest is polyethylene and since this invention is particularly applicable to high melting point polymers, the invention will be further described in conjunction with treatment of polyethylene prepared by polymerizing ethylene in cyclohexane solution at 285° F., 450 p.s.i.g. in the presence of 0.25 percent of a catalyst consisting of 2.5 percent chromium as the oxide on a 90/10 silica/alumina support. This catalyst had been activated in dry air at 950° F. for four hours.

Referring now to the drawing, polyethylene as recovered from the polymerization zone enters extruder 1 via hopper 2. The polyethylene is heated to above its softening point and is extruded as a plurality of strands 4 of about 1/8" diameter through the plurality of dies 3. These strands are pulled at a rate of approximately 50 feet per minute through primary bath 5 at 120° F. under roller 6. The strands then pass up through the atmosphere and over the bar 13 and back into bath 7 at 175° F. by passing under rollers 8 and 9. The strands are now completely solidified and enter chopper 10 where the strands are cut into 1/8" pellets 11 which are discharged into product receiver 12.

Those skilled in the art will see many modifications which can be made in the process without departing from the scope of the invention. For example, a different draw speed can be employed, different size pills can be produced, etc. The idler bars can be stationary polished metal instead of rollers, if desired. As has been earlier indicated, a third bath can be employed, if desired.

To further illustrate our invention, the following specific embodiment is given. The polyethylene was prepared by polymerizing ethylene in a cyclohexane solution at 285° F. and 450 p.s.i.g. in the presence of 0.25 weight percent catalyst consisting of 2.5 percent chromium as chromium oxide on a 90/10 silica-alumina support. This catalyst had been activated by heating to 950° F. for 4 hours in a dry air atmosphere. The polymer was recovered by mixing with water at 175° F., flashing and steam stripping cyclohexane and subsequently drying the polymer. The polymer thus recovered was placed in an extruder such as 1 and extruded as 1/8" diameter strands at a rate of 50 feet per minute and a temperature of 375° F. The strands pass for a residence distance of 2 inches through a water bath having a temperature of 125° F. The strands then pass through air at atmospheric temperature and over a water cooled idler bar such as 13 for a distance of about 2½ inches. The idler bar is cooled with service water and no effort is made to control the temperature otherwise. The strand surfaces are hardened in the first bath and the heat is redistributed during the travel over the idler bar, resoftening the surfaces. The strands then pass for a distance of about 6 feet through a water bath of 175° F. During this period, the strands become hard substantially throughout, however, to insure complete hardening, the strands are passed through a third bath at a temperature of 120° F. for a distance of 2 feet. The strands then pass to the draw roller and chopper 10 where they are cut as 1/8" pills. By such treatment no pock-marks or shrinkage voids are noticed. When the the strands are fed directly to the hot water bath, pock marks are formed which are believed due to the hot strands causing the hot water to boil. On the other hand, if the water is maintained at the low temperature until the strands are hardened throughout, shrinkage voids are prevalent throughout the strands.

This invention has been described in a preferred embodiment and modifications for the purpose of illustration and it will be obvious to those skilled in the art that the invention is not limited thereto. Those skilled in the art will see many modifications which can be made and still obtain the advantage of this invention.

We claim:

1. A process for preparing pellets of 1-olefin polymers which comprises heating the polymer to above its softening point, extruding the softened polymer as a continuous strand, passing the strand through a first water bath having a temperature within the range of 40 to 150° F. for a period only sufficient to cause the surface of said strand to harden, allowing the heat in said strand to redistribute thereby softening the said surface, passing the strand to a second water bath having a temperature in the range of 150° F. to the boiling point of said bath and being at least 20° F. higher than said first bath and below the softening point of the polymer for a time sufficient to permit the polymer to harden and thereafter chopping the strand into pellets.

2. A process for preparing pellets of ethylene polymers prepared by polymerizing 1-olefin monomers of 2 to 8 carbon atoms per molecule and having no branching nearer the double bond than the 4-position said monomers comprising at least 50 weight percent ethylene, said process comprising heating said polymer to above its softening point, extruding the softened polymer as a continuous strand, passing the strand through a first water bath having a temperature in the range of 40 to 140° F. for a time sufficient to cool the strand surface below its softening temperature, passing the strand through air for a period sufficient to allow said surface to again soften, passing the stream to a second water bath having a temperature in the range of 160 to 200° F. for a time sufficient to cool the strand below its softening temperature and thereafter cutting the strand into pellets.

3. The process of claim 2 wherein the ethylene polymer is prepared in a hydrocarbon solvent in the presence of a chromium oxide catalyst and at a temperature within the range of 100 to 500° F.

4. A process for finishing ethylene polymers prepared by polymerizing 1-olefin monomers of 2 to 8 carbon atoms per molecule and having no branching nearer the double bond than the 4-position, said monomers comprising at least 90 weight percent ethylene, said process comprising heating said polymer to a temperature in the range of 350 to 420° F., extruding the heated polymer as a continuous strand, passing the strand through a first water bath having a temperature in the range of 120 to 140° F. for a time only sufficient to cool the strand surface below its softening temperature, passing the thus cooled strand through air for a period sufficient for the heat in said strand to again soften the said surface, passing the softened strand to a second water bath having a temperature in the range of 160 to 200° F. for a time sufficient to cool the strand to below its softening temperature, and thereafter removing the strand from said bath.

5. The process of claim 4 wherein the polymer is prepared in a hydrocarbon solvent in the presence of a chromium oxide catalyst and at a temperature within the range of 150 to 500° F.

6. The process of claim 5 wherein the monomers consist of ethylene.

7. The process of claim 6 wherein the strand is cut into pellets.

8. In the process of extruding 1-olefin polymers as strands, the improvement comprising passing the extruded strand through a first fluid having a temperature in the range 40 to 150° F. for a time to harden only the surface of said strand, passing the strand through a second fluid wherein the heat of said strand is redistributed thereby softening said surface and thereafter passing said strand through a third fluid having a temperature of at least 150° F. and at least 20° F. above said first fluid and below the softening point of the polymers for a time sufficient to harden the entire strand.

References Cited in the file of this patent

UNITED STATES PATENTS

| | | |
|---|---|---|
| 2,365,374 | Bailey | Dec. 19, 1944 |
| 2,464,746 | Gering | Mar. 15, 1949 |
| 2,514,088 | Pinsky | July 4, 1950 |
| 2,746,086 | Vickers | May 22, 1956 |